(No Model.)

C. P. WETHERILL.
STUFFING BOX.

No. 358,714. Patented Mar. 1, 1887.

WITNESSES:

INVENTOR:
C. P. Wetherill
BY Munn & Co.
ATTORNEYS.

UNITED STATES PATENT OFFICE.

COTESWORTH P. WETHERILL, OF WOODVILLE, MISSISSIPPI.

STUFFING-BOX.

SPECIFICATION forming part of Letters Patent No. 358,714, dated March 1, 1887.

Application filed November 2, 1886. Serial No. 217,807. (No model.)

*To all whom it may concern:*

Be it known that I, COTESWORTH P. WETHERILL, of Woodville, in the county of Wilkinson and State of Mississippi, have invented a new and useful Improvement in Stuffing-Boxes, of which the following is a full, clear, and exact description.

This invention relates to stuffing-boxes for the cylinders of engines, pumps, and other machines or apparatus; and it consists in a gland of separable construction and adapted to hold the packing for use in connection with a neck or collar on the cylinder head or lid, substantially as hereinafter described and pointed out in the claim, and whereby increased facility is afforded for inserting and removing the packing when required.

Reference is to be had to the accompanying drawings, forming a part of this specification, in which similar letters of reference indicate corresponding parts in all the figures.

Figure 1:
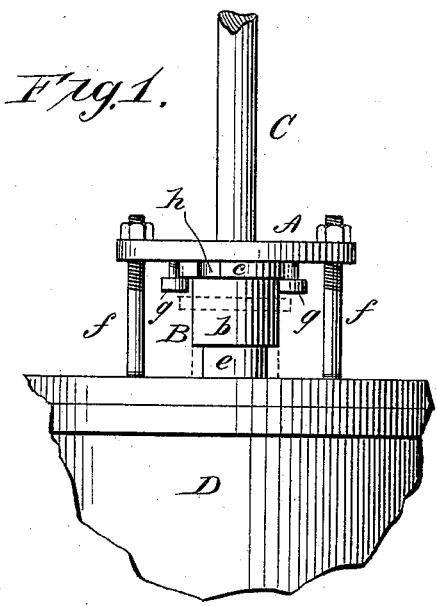
Figure 2:
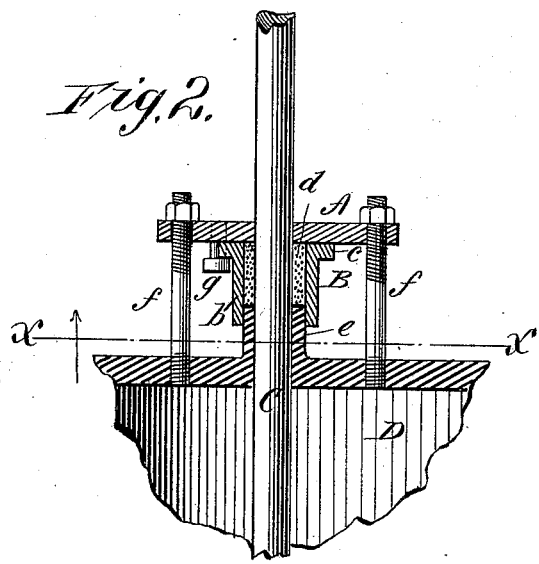
Figure 3:
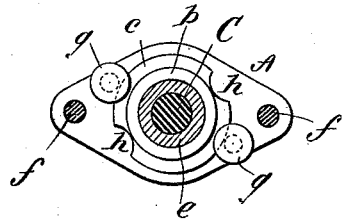

Figure 1 represents a longitudinal view or elevation of a cylinder and piston-rod in part with my improved stuffing-box applied; Fig. 2, a longitudinal or vertical section of the same, and Fig. 3 a section upon the line $x\ x$ in Fig. 2.

The gland of the stuffing-box is composed of two separate and distinct parts, A B. The one A of these parts is an outer flanged plate, and the other part, B, a ring or collar, $b$, provided at its outer end with a low and smaller flange, $c$, the outer surface of which is adjacent to or bears against the inner face of the flanged plate A. The part B is of sufficient interior capacity to contain the packing $d$, which may be of any suitable kind, and which, surrounding the piston-rod C of the cylinder D, is compressed against or on a neck, $e$, upon the cylinder head or lid when the gland or "stuffing-box," as it may be termed, is forcibly held down to its place by the stud-bolts $f\ f$, screwed into the cylinder-head, or by ordinary T-headed bolts engaging with the cylinder-head, the collar portion $b$ of the gland or stuffing-box being constructed to slide longitudinally, as well as to turn when required, upon the cylinder - neck $e$, which virtually forms a plunger, receiving the piston-rod C through it. The collar portion $b$ is held up to or against the flanged plate A by clips or headed bolts $g\ g$, projecting from the back or inner face of the flanged plate A and entered, on suitably turning the collar $b$, through recesses $h\ h$ in the flange $c$ of the collar, so that on turning the collar portion $b$ back again to its normal position, with the recesses $h\ h$ out of line with said bolts, the heads of the bolts will engage with the flange $c$ by bearing against the back or inner face thereof, and thereby form locking attachments of the parts A and B. This construction of the stuffing - box greatly facilitates the insertion and removal of the packing when required, especially in contracted and awkward places and elsewhere.

Having thus described my invention, what I claim as new, and desire to secure by Letters Patent, is—

The portion B of the stuffing-box, composed of a collar, $b$, adapted to hold the packing within it and provided with a flange, $c$, having recesses $h$, in combination with the outer separate flanged plate, A, the headed locking attachments or bolts $g$, and the neck $e$, essentially as described.

COTESWORTH P. WETHERILL.

Witnesses:
A. GREGORY,
C. SEDGWICK.